United States Patent
Kasapi et al.

(10) Patent No.: US 7,020,107 B2
(45) Date of Patent: Mar. 28, 2006

(54) METHODS FOR RELIABLE USER SWITCHBACK ON A PHS SPATIAL DIVISION MULTIPLE ACCESS CHANNEL

(75) Inventors: Athanasios A. Kasapi, San Francisco, CA (US); Adam B. Kerr, Menlo Park, CA (US); Xiaoming Yu, Cupertino, CA (US); Lars Johan Persson, Stockholm (SE)

(73) Assignee: Arraycomm, LLC, San Jose, CA (US)

( * ) Notice: Subject to any disclaimer, the term of this patent is extended or adjusted under 35 U.S.C. 154(b) by 0 days.

(21) Appl. No.: 10/348,923

(22) Filed: Jan. 21, 2003

(65) Prior Publication Data

US 2004/0141478 A1 Jul. 22, 2004

(51) Int. Cl.
*H04Q 7/00* (2006.01)

(52) U.S. Cl. .................. 370/329; 370/339; 370/344; 370/503

(58) Field of Classification Search ............ 370/319, 370/322, 324, 326, 329, 339–341, 351, 395.21, 370/395.41, 397, 431, 433, 443, 503, 334, 370/323, 330, 336, 337, 241, 294, 400, 343–347; 455/25, 67.1, 522, 562, 562.2; 342/457
See application file for complete search history.

(56) References Cited

U.S. PATENT DOCUMENTS

| | | | | |
|---|---|---|---|---|
| 4,398,291 A | * | 8/1983 | Hotta et al. ............. 370/323 |
| 5,508,707 A | * | 4/1996 | LeBlanc et al. .......... 342/457 |
| 5,621,720 A | * | 4/1997 | Bronte et al. ............ 370/241 |
| 6,026,304 A | * | 2/2000 | Hilsenrath et al. ....... 455/456.2 |
| 6,463,295 B1 | * | 10/2002 | Yun ...................... 455/522 |
| 6,735,182 B1 | * | 5/2004 | Nishimori et al. ......... 370/294 |
| 2002/0013164 A1 | * | 1/2002 | Leifer et al. ............. 455/562 |
| 2002/0115474 A1 | * | 8/2002 | Yoshino et al. ........... 455/562 |
| 2002/0150109 A1 | * | 10/2002 | Agee ..................... 370/400 |
| 2003/0040281 A1 | * | 2/2003 | Nakao et al. ............. 455/67.1 |
| 2003/0045233 A1 | * | 3/2003 | Doi ....................... 455/25 |
| 2003/0139202 A1 | * | 7/2003 | Doi et al. ................ 455/562 |
| 2004/0095907 A1 | * | 5/2004 | Agee et al. .............. 370/334 |

FOREIGN PATENT DOCUMENTS

WO    WO 01/71947 A1    9/2001

OTHER PUBLICATIONS

PCT International Search Report, Dec. 1, 2004, 3 pages.

* cited by examiner

*Primary Examiner*—Phirin Sam
*Assistant Examiner*—Anthony Ton
(74) *Attorney, Agent, or Firm*—Blakely Sokoloff Taylor & Zafman LLP (57) ABSTRACT

An embodiment of the invention provides a method for effecting switchback on a spatial division multiple access (SDMA) PHS channel. A communication signal is broadcast over each of one or more SDMA channels of a multi-access channel to one or more corresponding user terminals. A set of transmit spatial weights is determined for a synchronization burst to a user terminal attempting to reestablish communication over an SDMA channel of the multi-access channel. The set of transmit spatial weights is determined such that interference caused by one or more communication signals to the synchronization burst is reduced.

33 Claims, 7 Drawing Sheets

METHODS FOR RELIABLE USER SWITCHBACK ON A PHS SPATIAL DIVISION MULTIPLE ACCESS CHANNEL

FIELD

Embodiments of the invention relate generally to the field of signal processing in radio communication systems, and more particularly to the methods for providing reliable switchback in a spatial division multiple access system.

BACKGROUND

Radio communication systems may have a cellular architecture, with each cell corresponding roughly to a geographical area. Each cell includes a base station (BS), which is a local central cite through which a number of radio transmitter/receiver units (user terminals (UTs)) gain access to the communications system. The UTs could be, for example, telephones, PDAs, or small modem boards. A UT establishes a communication link with other UTs by requesting access to the system through the BS. Each UT communicates over a communication channel distinguished from other UTs.

Various techniques exist to increase the number of available channels for a given number of available frequencies. Time division multiple access (TDMA), for example, divides a single frequency into multiple time slots. Each of the time slots can then be allocated to a separate communication channel. Other known techniques include code division multiple access (CDMA) and frequency division multiple access (FDMA), which, like TDMA, are considered conventional multiple access (multi-access) channel schemes.

Radio communications systems may employ a spatial division multiple access (SDMA) scheme, in conjunction with one or more conventional multiple access schemes, to increase the number of UTs that a BS can serve for a given number of available frequencies. An SDMA scheme may be implemented using a BS that has an array of receiver antenna elements. The antenna elements are spaced, one from another, typically about a half of a meter apart. The array of antenna elements introduces a spatial dimension that can be used to differentiate two or more UTs concurrently accessing a given conventional channel. That is, the basis of an SDMA system is that the BS creates a spatially distinct SDMA channel for each of multiple users even though they share the same carrier frequency (FDMA), timeslot (TDMA), or spreading code (CDMA).

This is done by weighting the uplink signal (communications from a UT to a BS) from each antenna element in amplitude and phase by a spatial demultiplexing weight (receive spatial weight), all the receive spatial weights determine a complex valued receive spatial weight vector which is dependent on the spatial signature of the UT. The spatial signature characterizes how the BS array receives signals from a particular UT. On the downlink (communications from the BS to a UT), transmission is achieved by weighting the signal to be transmitted by each array element in amplitude and phase by a set of respective spatial multiplexing weights (transmit spatial weights), all the transmit spatial weights for a particular UT determine a complex-valued transmit spatial weight vector which also is dependent on the spatial signature of the UT. When transmitting to several UTs on the same conventional channel, the sum of weighted signals is transmitted at the antenna arrays.

The weighting of the signals either on the uplink from each antenna element in an array of antennas, or on the downlink to each antenna element is referred to as spatial processing. The term SDMA channel is used to refer to each of multiple, spatially distinct channels of a conventional channel.

Personal Handyphone System (PHS)

A PHS is a TDMA-based system operating in the 1.88 GHz–1.93 GHz band and providing dynamic channel allocation. A UT of such a system uses a Traffic Channel (TCH) to communicate with the BS. If the TCH in use (i.e., the original channel) deteriorates, the UT will attempt to switch to another channel (destination channel). The switch may be to another TDMA channel provided by the same BS as the original channel. Such a switch is referred to as a TCH switch (channel switch). Alternatively, the switch may be to another BS, and if so, is referred to as a handover.

An attempted switch is not always successful. For various reasons it may not be possible to establish the communication link on the destination channel. For such situations it may be desirable to reestablish the communication link on the original channel rather than terminate the communication link. This process of reestablishing the communication link on the original channel is referred to as switchback.

Switchback

Figure 1A:
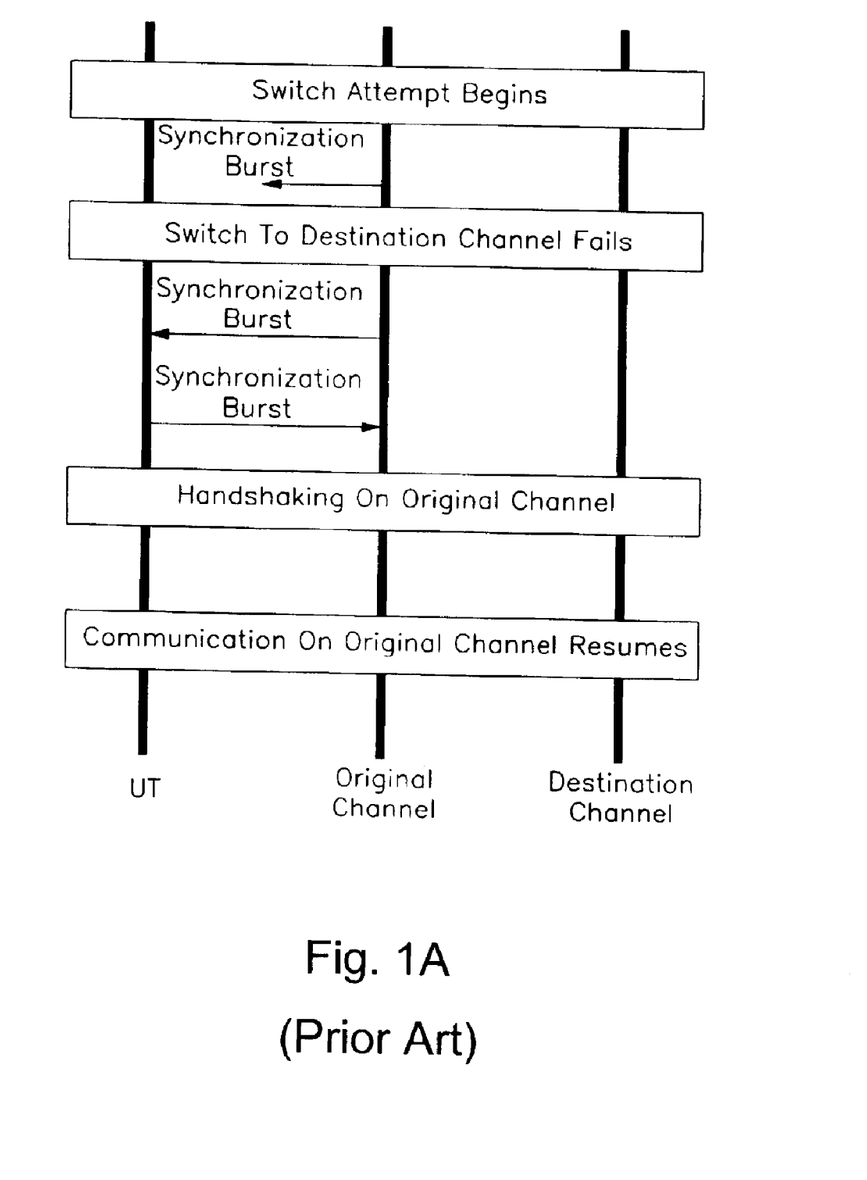
FIG. 1A illustrates a process in which a UT effects a switchback to an original channel on a PHS after an attempted channel switch failure in accordance with the prior art.

FIG. 1A illustrates a process in which a UT effects a switchback to an original channel on a PHS after an attempted channel switch failure in accordance with the prior art. As shown in FIG. 1A, the BS uses the original channel to broadcast a synchronization burst as the UT attempts a switch to a destination channel. This downlink synchronization burst provides a mechanism for the UT to reestablish a communication link on the original channel if the attempted switch fails. The synchronization burst is broadcast repeatedly throughout the attempted switch and switchback process. Upon failure of the attempted switch to the destination channel, the UT attempts to locate the downlink synchronization burst from the BS. The downlink synchronization burst indicates to the UT that a communication link can be reestablished on the original channel. Upon receiving the downlink synchronization burst, and determining that it can receive downlink synchronization bursts correctly, the UT broadcasts its own synchronization burst to the BS. This "handshaking" reestablishes a communication link for the UT on the original channel.

For a conventional PHS the switchback is not problematic because the TDMA timeslot of the original channel is vacant at the time of switchback and therefore both the downlink synchronization burst and the uplink synchronization burst can be received without interference. However, this is not the case for an SDMA PHS in which each timeslot accommodates multiple spatially distinct channels.

Figure 1B:
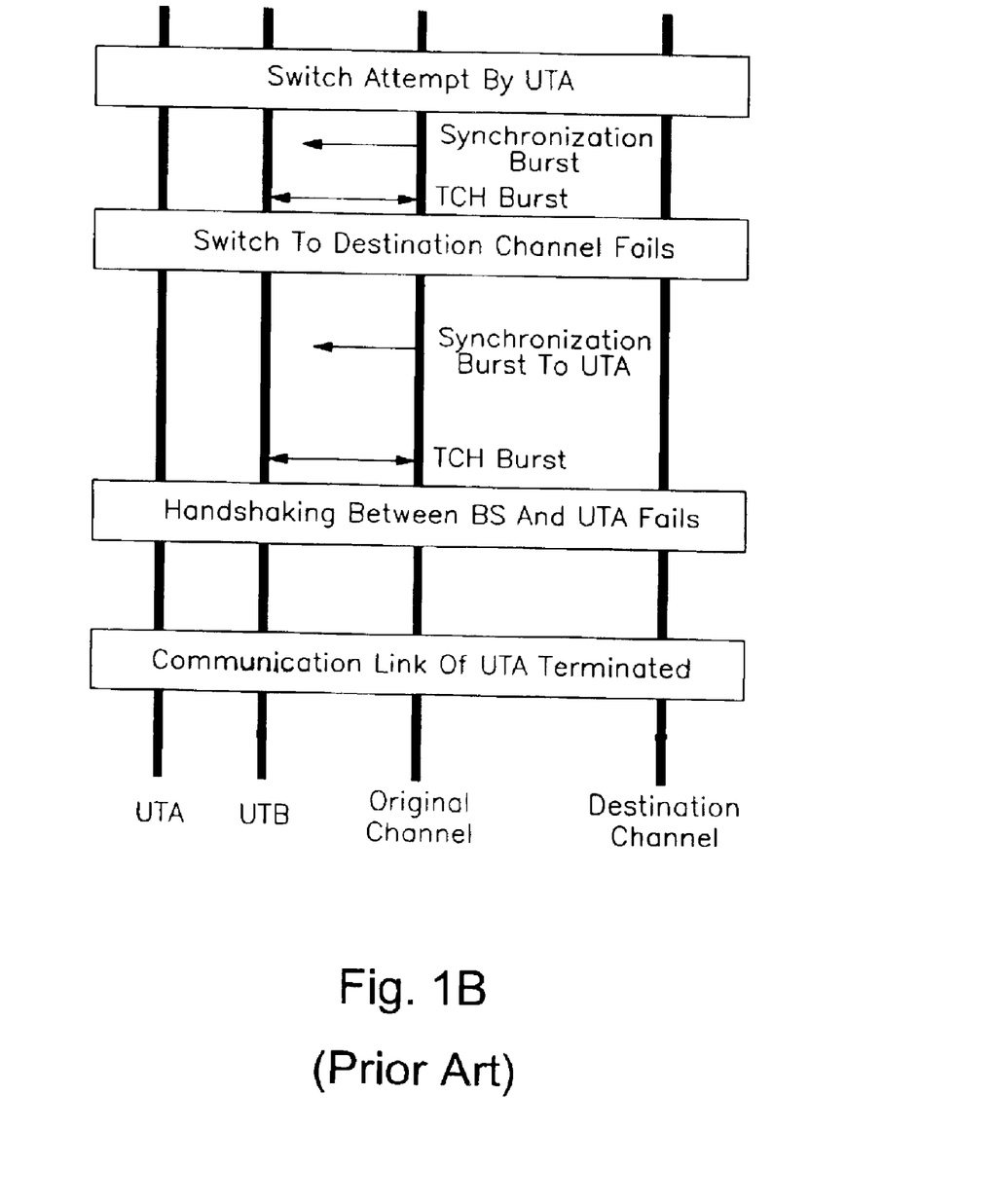
FIG. 1B illustrates a drawback of an SDMA PHS in the context of UT switchback in accordance with the prior art.

FIG. 1B illustrates a drawback of an SDMA PHS in the context of UT switchback in accordance with the prior art. As shown in FIG. 1B, UT A is one of multiple UTs assigned to a given TDMA channel (original channel) on one of multiple SDMA channels of the original channel. When UT A attempts a switch to the destination channel the BS begins broadcasting the synchronization burst to UT A on the original channel in preparation of a possible switchback. During this time, UT B is communicating with the BS over the original channel (albeit a spatially distinct channel of the original TDMA channel). The downlink TCH burst from the BS to UT B may cause severe interference with the downlink synchronization burst from the BS to UT A. That is, because the spatial signature of UT A is not known, the BS cannot focus the signal energy of the downlink synchronization burst to the extent necessary to overcome interference from the remaining TCH signals. In such cases, the handshaking between the BS and the UT attempting switchback (e.g., UT A) fails and the communication link for UT A may be terminated.

SUMMARY

An embodiment of the invention provides a method for effecting switchback on an SDMA PHS channel. A communication signal is broadcast over each of one or more SDMA channels of a multi-access channel to one or more corresponding user terminals. A set of transmit spatial weights is determined for a synchronization burst to a user terminal attempting to reestablish communication over an SDMA channel of the multi-access channel. The set of transmit spatial weights is determined such that interference caused by one or more communication signals to the synchronization burst is reduced.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION
Overview

Embodiments of the invention provide methods for effecting switchback on an SDMA PHS channel. For one embodiment, the transmit spatial weights for a synchronization burst to a user terminal attempting switchback on an SDMA channel are determined to reduce interference between the synchronization burst and one or more communication signals transmitted on other SDMA channels of the same multi-access channel. For such an embodiment, the transmit spatial weights of the synchronization burst may be determined to be orthogonal to the spatial signature of such communication signals. Additionally, or alternatively, the amplitude of the transmit spatial weights of one or more of the communication signals may be attenuated to reduce interference with the synchronization burst.

In an alternative embodiment, the transmit spatial weights of the synchronization burst are determined to reduce interference with communication signals transmitted on other SDMA channels of the same multi-access channel and also based upon characteristics of the user terminal attempting switchback.

It is the intended advantage of an embodiment of the invention to improve the reliability and effectiveness of a switchback process by increasing the likelihood of successful switchback without unduly jeopardizing the transmission of communication signals over other SDMA channels of the same multi-access channel. It is another intended advantage of an embodiment of the invention to increase the signal-to-interference-plus-noise-ratio (SINR) of the synchronization burst while maintaining established communication links.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Figure 2:
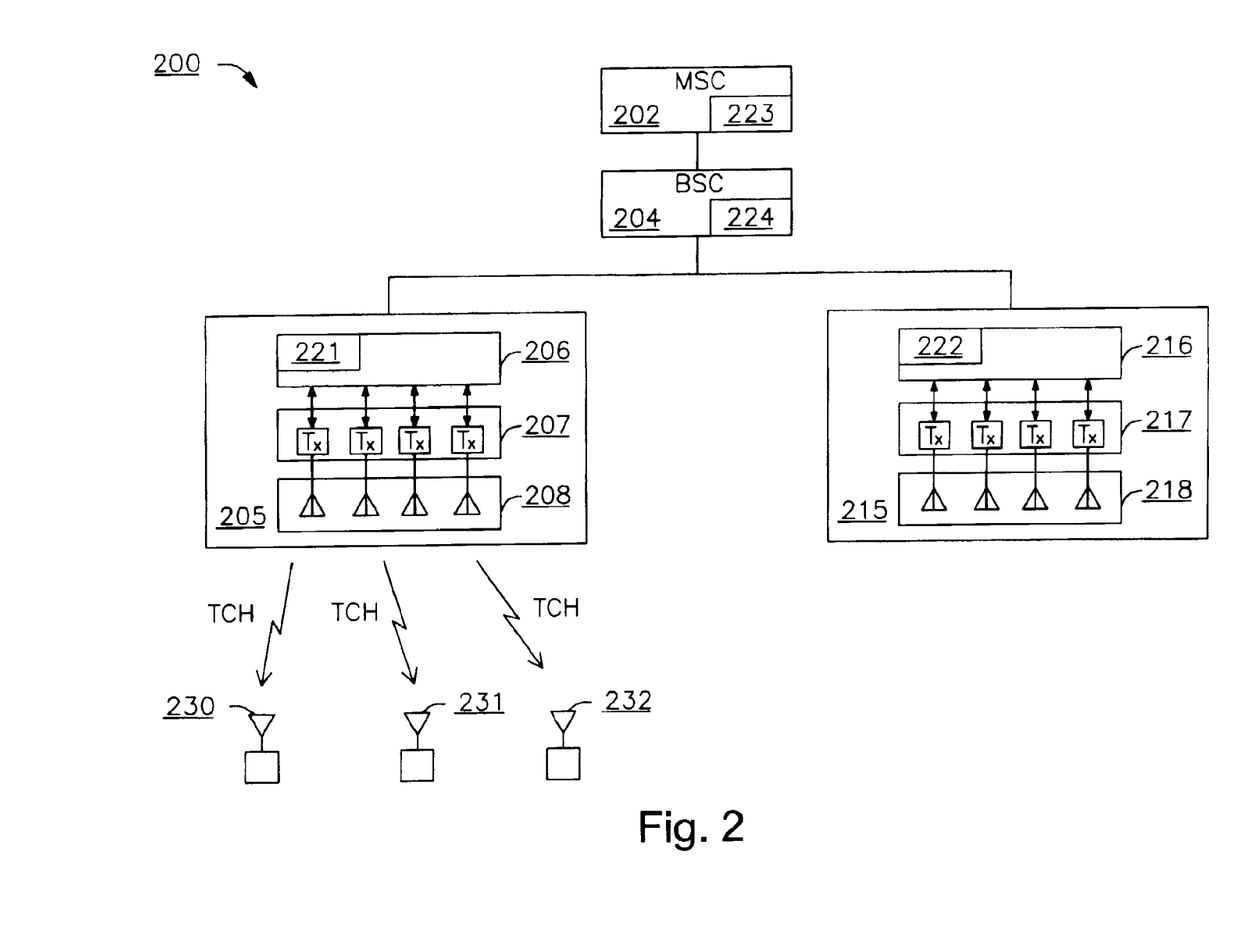
FIG. 2 illustrates an exemplary cellular wireless communication network providing reliable switchback in accordance with one embodiment of the invention.

FIG. 2 illustrates an exemplary cellular wireless communication network providing reliable switchback in accordance with one embodiment of the invention. Network 200, shown in FIG. 2, includes a mobile switching center (MSC) 202. Coupled to MSC 202 is a base station controller (BSC) 204. BSC 204 has BSs 205 and 215 coupled to it. Each BS, includes a processing unit, labeled 206 and 216, respectively, that determine the transmit spatial weights for the communication signals and synchronization bursts and apply the weights to the respective transmissions. The BS processing unit may be implemented as software, hardware or a combination thereof. Each base station also includes a transmitter unit, labeled 207 and 217, respectively, that transmits the communication signals and synchronization burst. The transmitter unit typically includes a modulator, a digital-to-analog converter, and an amplifier, not shown. Each base station also includes an antenna array, labeled 208 and 218, respectively, in order to support an SDMA-based system. Though each antenna array is shown with four antenna elements the number of antenna elements may vary.

In accordance with an embodiment of the invention, the BS processing units, 206 and 216 include reliable switchback functionality, labeled 221 and 222, respectively. This functionality allows the base station to determine a set of transmit spatial weights for a synchronization burst such that interference with communication signals is reduced, thus increasing the SINR of the synchronization burst. This allows a greater likelihood of synchronization burst reception by a switchback UT with reduced likelihood of interfering with established communication links. In alternative embodiments, the MSC 202, and/or the BSC 204, may contain reliable switchback functionality, labeled 223 and 224, respectively, which may include software, hardware, or a combination thereof.

The network 200 also includes a plurality of UTs communicating through the BS over distinct SDMA channels of the same multi-access channel. For example, UTs 230–232 may be receiving a communication signal from BS 205 over three distinct SDMA channels of a single TDMA timeslot. If one or more UTs attempts a channel switch or handover, the original channel begins broadcasting a synchronization burst. In accordance with one embodiment of the invention, the reliable switchback functionality determines transmit spatial weights for the synchronization burst such that interference with communication over the other SDMA channels in the same TDMA timeslot is reduced. In accordance with alternative embodiments of the invention, the amplitude of the transmit spatial weights of the transmitted signal for one or more established communication links may be attenuated, thus further increasing the SINR of the synchronization burst.

Exemplary Applications

Figure 3A:
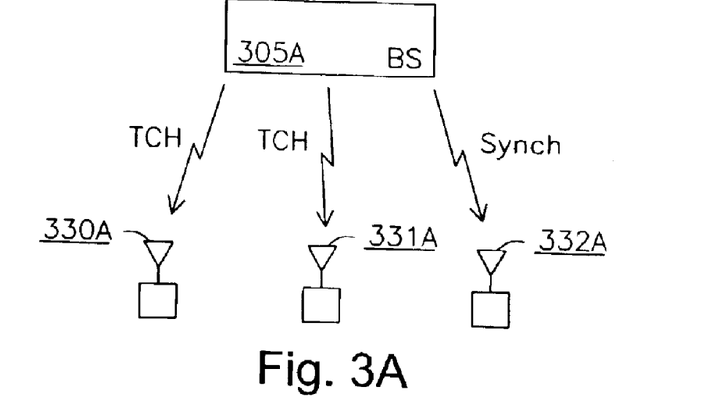
FIGS. 3A–3C illustrate various switchback scenarios for a wireless communication network that may be addressed by respective alternative embodiments of the invention.
Figure 3B:
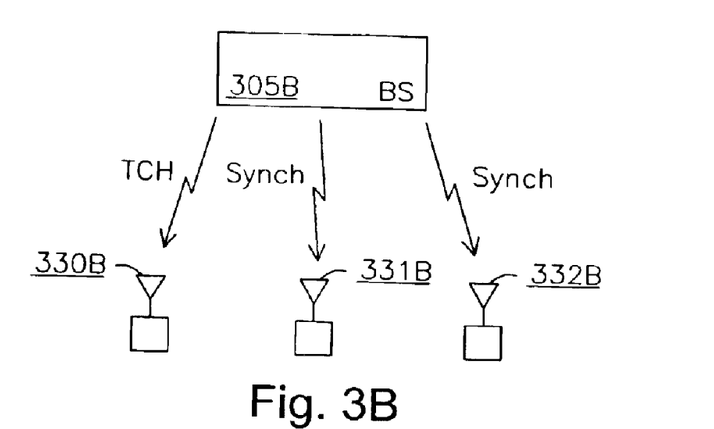
Figure 3C:
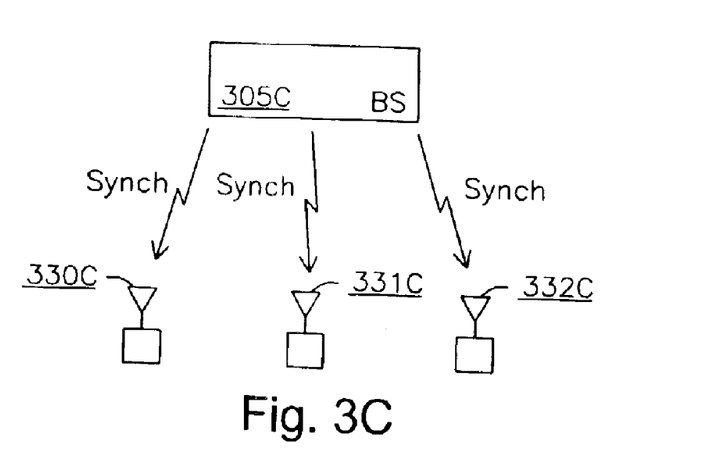

The following portion of the description will describe how various switchback scenarios are addressed in accordance with alternative embodiments of the invention. FIGS. 3A–3C illustrate various switchback scenarios for a wireless communication network that may be addressed by respective alternative embodiments of the invention.

Single UT Switchback

FIG. 3A illustrates a network in which a single UT is attempting a switch with one or more communication links established on the same multi-access channel. As shown in FIG. 3A, BS 305A is communicating with two UTs, namely, 330A and 331A over SDMA communication channels. The BS 305A is transmitting a synchronization burst to a UT 332A that has attempted a switch.

Figure 4:
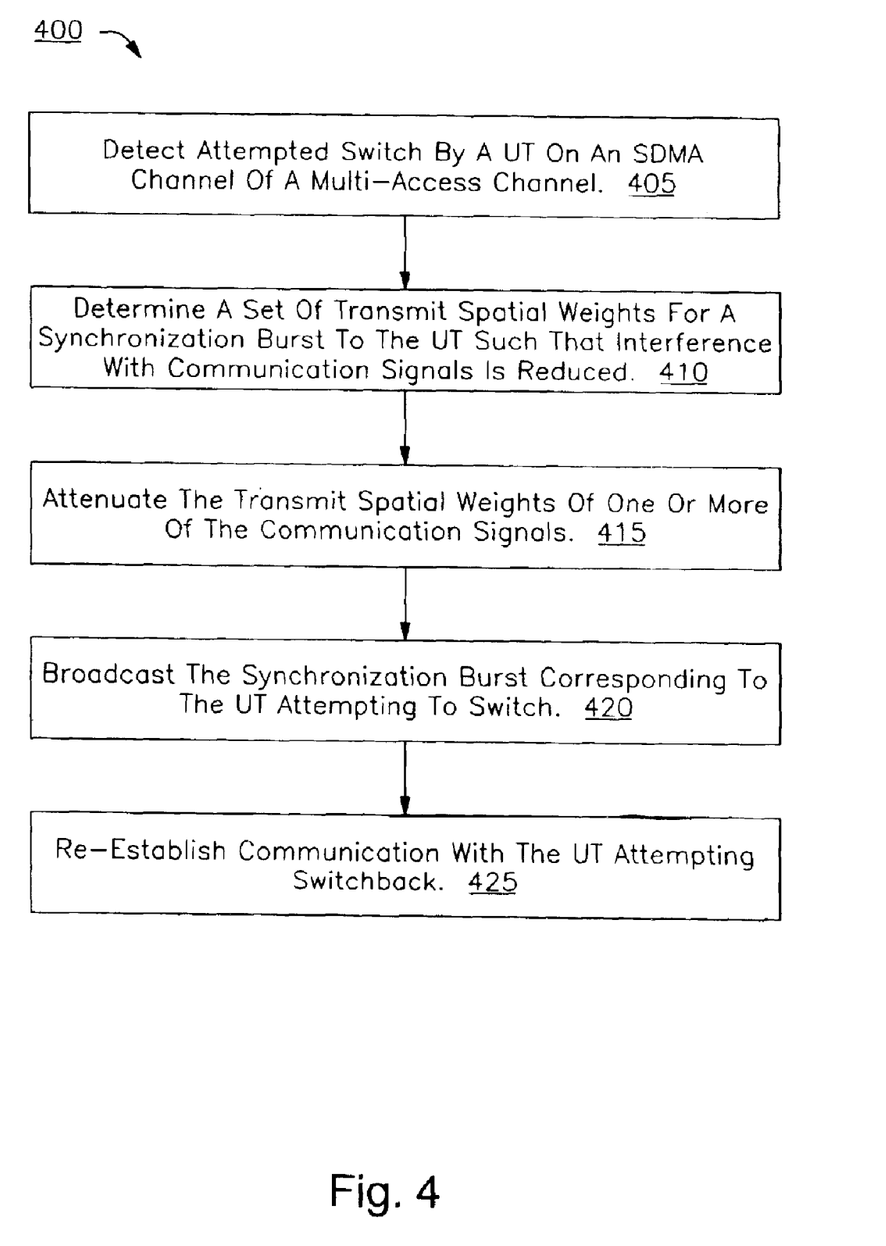
FIG. 4 illustrates a process by which reliable switchback to an SDMA channel is effected for a network in which a single UT is attempting switchback with one or more communication links established on the same multi-access channel.

FIG. 4 illustrates a process by which reliable switchback to an SDMA channel is effected for the switchback scenario depicted in FIG. 3A. Process 400, shown in FIG. 4, begins at operation 405 in which the BS detects that a UT (e.g., UT 332A) is attempting a switch (channel switch or handover). In the event the switch fails, UT 332A will attempt switchback.

At operation 410 the BS processing unit determines a set of transmit spatial weights for the synchronization burst to UT 332A. The transmit spatial weights are determined such that interference between the synchronization burst and the communication signals to UTs 330A and UT 331A is reduced. For one embodiment, transmit spatial weights that are orthogonal to the spatial signature of one or more of the UTs communicating over the multi-access channel are used for the synchronization burst. Such orthogonal transmit spatial weights reduce the SINR of the synchronization burst and increase the likelihood of reestablishing communication with the UT in switchback.

Alternatively, or additionally, the transmit spatial weights for the synchronization burst may be selected based upon a characteristic of the UT in switchback (e.g., 332A). For example, the transmit spatial weights may be determined based upon the most recently known spatial signature of UT 332A (i.e., toward the location of UT 332A prior to the attempted switch). By focusing the energy of the synchronization burst based upon the spatial signature of UT 332A, the likelihood of reestablishing communication is increased.

At operation 415 the amplitude of the transmit spatial weights of one or more of the communication signals may be attenuated. For example, the amplitude of the transmit spatial weights of the communication signals transmitted by the BS 305A to UTs 330A and 331A may be attenuated to further increase the SINR of the synchronization burst to UT 332A. The amount by which the amplitude of the transmit spatial weights is attenuated may be chosen so as to maintain a specified likelihood that communication with UTs 330A and 331A remains established.

At operation 420 the synchronization burst corresponding to the UT attempting a switch is broadcast. If the switch has failed, the UT attempting a switch attempts to locate the downlink synchronization burst from the BS. The operations of determining transmit spatial weights for the synchronization burst and attenuating the amplitude of the transmit spatial weights of one or more communication signals in accordance with an embodiment of the invention increases the likelihood that the UT will locate the synchronization burst.

At operation 425 the UT receives the downlink synchronization burst. The synchronization burst indicates to the UT that a communication link can be reestablished on the original channel. The UT then broadcasts an uplink synchronization burst and reestablishes a communication link on the original channel as described above.

Multiple UT Switchback with Communication Link Present

FIG. 3B illustrates a network in which multiple UTs are attempting a switch with one or more communication links established on the same multi-access channel. As shown in FIG. 3B, BS 305B is communicating with UT 330B over an SDMA communication channel. The BS 305B is transmitting a synchronization burst to each of the UTs that have attempted a switch, namely 331B and 332B.

This situation is problematic because it is difficult to determine transmit spatial weights for two or more synchronization bursts so as to reduce mutual interference between the synchronization bursts. That is, transmit spatial weights may be determined for a synchronization burst so as to reduce interference with one or more communication signals because the spatial signatures of the UTs receiving the communication signals are known. However, the spatial signatures of UTs in switchback are not known.

Figure 5:
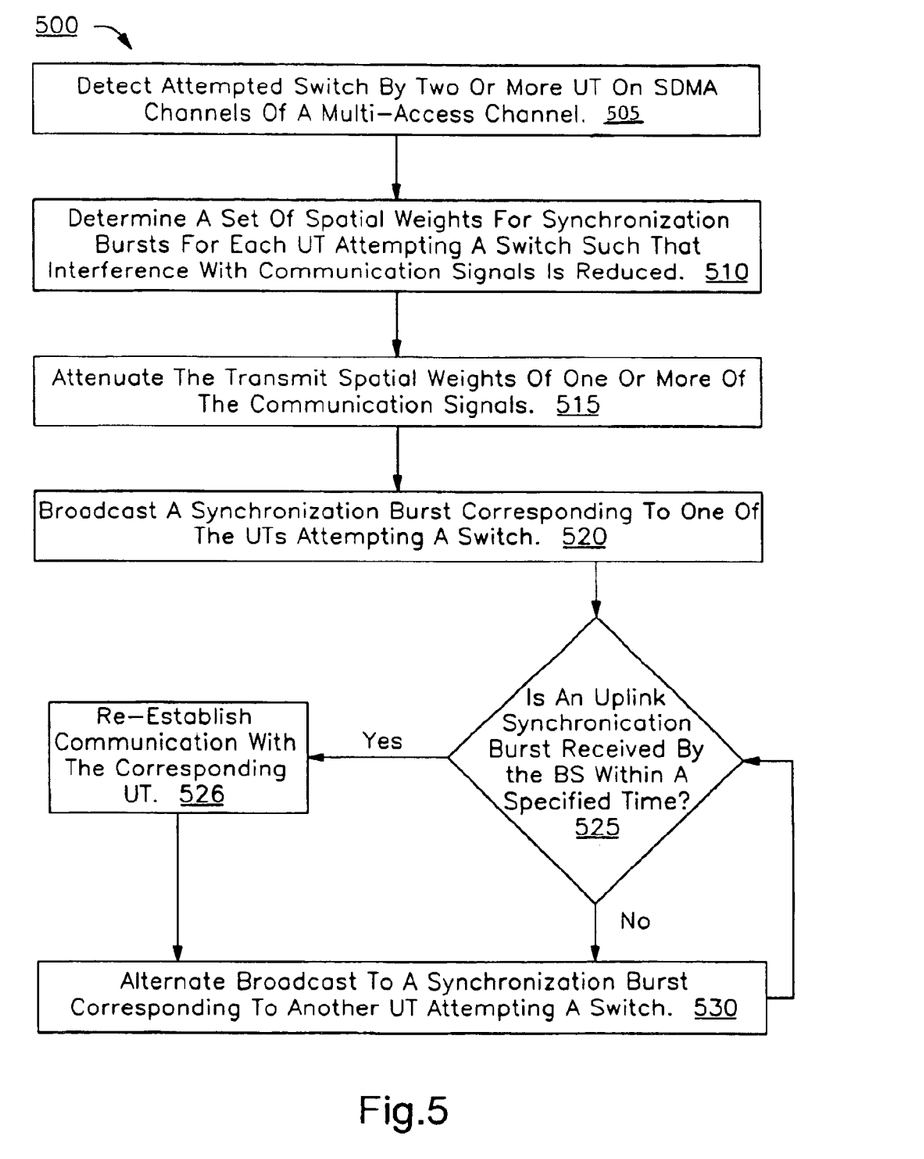
FIG. 5 illustrates a process by which reliable switchback to an SDMA channel is effected for a network in which multiple UTs are attempting switchback with one or more communication links established on the same multi-access channel.

FIG. 5 illustrates a process by which reliable switchback to an SDMA channel is effected for the switchback scenario depicted in FIG. 3B. Process 500, shown in FIG. 5 begins at operation 505 in which the BS detects that two or more UTs (e.g., UT 331B and UT 332B) are attempting a switch.

At operation 510 the BS processing unit determines a set of transmit spatial weights for synchronization bursts to UT 331B and 332B. The transmit spatial weights are determined such that interference between the synchronization bursts and the communication signals on established communication links (e.g. UT 330B) is reduced as described above.

At operation 515 the amplitude of the transmit spatial weights of one or more of the communication signals may be attenuated as described above.

At operation 520 a synchronization burst corresponding to one of the UTs (e.g., UT 331B) attempting a switch is broadcast. The synchronization bursts corresponding to other UTs attempting a switch are not broadcast at this time.

At operation 525, if the BS receives an uplink synchronization burst, then communication with the corresponding UT is reestablished on the original SDMA channel, at operation 526, as described above.

If, communication is reestablished, or if, at operation 525, the BS does not receive an uplink synchronization burst within a specified time, then, at operation 530, the BS ceases broadcasting the synchronization burst to the UT and begins broadcasting a synchronization burst to another UT attempting a switch (e.g., UT 332B). This process is continued with the BS alternating broadcast of synchronization bursts until communication is reestablished with all of the UTs attempting switchback or it is determined that reestablishing communication with the UT on the SDMA channel is not necessary (i.e., the switch successful) or not possible.

Multiple UT Switchback no Communication Links

FIG. 3C illustrates a network in which multiple UTs are attempting a switch with no communication links established on the same multi-access channel. As shown in FIG. 3C, BS, 305C is attempting to reestablish communication with Uts, 330C–332C over SDMA communication channels. The BS 305C is transmitting a set of synchronization bursts, each corresponding to one of the Uts that has attempted a switch.

In such a case, it is expeditious to take advantage of the lack of communication signals. That is, initially there are no communication signals, and therefore until communication with one of the UTs in switchback has been reestablished, there is no need to specifically tailor the transmit spatial weights of the synchronization burst.

Figure 6:
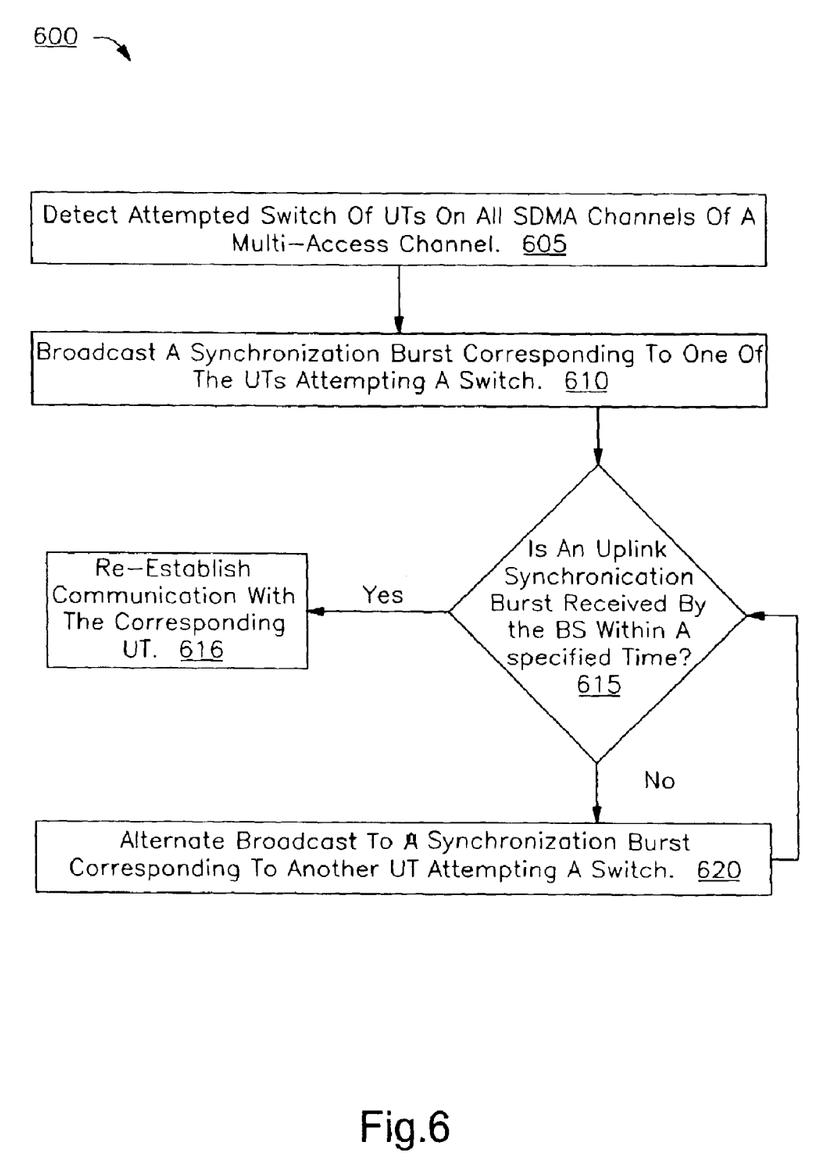
FIG. 6 illustrates a process by which reliable switchback to an SDMA channel is effected for a network in which multiple UTs are attempting switchback with no communication links established on the same multi-access channel.

FIG. 6 illustrates a process by which reliable switchback to an SDMA channel is effected for the switchback scenario depicted in FIG. 3C. Process 600, shown in FIG. 6, begins with operation 605 in which an attempted switch by each UT on all of the SDMA channels of a multi-access channel.

At operation 610 a synchronization burst corresponding to one of the UTs attempting a switch is broadcast. The absence of communication signals on the same multi-access channel means that there is no need to consider interference between such signals. That is, there is no need to consider specific transmit spatial weights for the synchronization burst, and therefore the transmit spatial weights may be chosen to increase the likelihood of reception by the corresponding UT. For one embodiment, transmit spatial weights based a most recently known spatial signature of the UT may be used. For an alternative embodiment, the transmit spatial weights may be chosen so as to generate a radiation pattern as close to omni-directional as possible.

At operation 615, if the BS receives an uplink synchronization burst, then communication with the corresponding UT is reestablished on the original SDMA channel, at operation 616, as described above.

If communication is reestablished, or if, at operation 615, the BS does not receive an uplink synchronization burst within a specified time, then, at operation 620, the BS ceases broadcasting the synchronization burst to the UT and begins broadcasting a synchronization burst to another UT attempting a switch. This process is continued with the BS alternating broadcast of synchronization bursts until communication is reestablished with one of the UTs attempting switchback or it is determined that reestablishing communication with the UTs on the SDMA channel is not necessary or not possible.

Once communication with a UT attempting switchback has been reestablished the switchback scenario is now as described above in reference to either FIG. 3A or FIG. 3B and may be addressed as described in FIG. 4 or FIG. 5, respectively.

General Matters

Cellular communications systems that provide switchback in the event of a failed user terminal switch should be able to effect switchback while avoiding interference with communication signals. Embodiments of the invention may be applied to reliably effect switchback in such a system. Though described above in reference to an SDMA system, the principles of the invention may be applied to any communication system that provides switchback. While several embodiments have been described in relation to their application to systems employing a specific air interface (e.g., PHS), embodiments of the invention may be likewise applicable to a variety of other systems. In alternative embodiments, the determination and application of the transmit spatial weights may be accomplished at a BS, a BSC, an MSC, or a combination of these control devices.

The invention includes various operations. For various embodiments, one or more of the operations described may be deleted. The operations of the invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other types of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection). The operations may be performed at a BS, a BSC, an MSC, or performed by a combination of these control devices.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    transmitting a communication signal over each of one or more spatial division multiple access (SDMA) channels of a multi-access channel to one or more corresponding user terminals;
    determining a set of transmit spatial weights for a synchronization burst corresponding to one of one or more user terminals attempting to reestablish communication over an SDMA channel of the multi-access channel, the set of transmit spatial weights determined such that interference caused by one or more communication signals to the synchronization burst is reduced;
    broadcasting the synchronization burst to the corresponding user terminal; and
    determining a set of transmit spatial weights for a synchronization burst corresponding to a next user terminal of the one or more user terminals attempting to reestablish, communication over an SDMA channel of the multi-access channel, the set of transmit spatial weights determined such that interference between the synchronization burst corresponding to the next user terminal and the one or more communication signals is reduced.

2. The method of claim 1 wherein the set of transmit spatial weights of the synchronization burst are orthogonal to a spatial signature of at least one of the one or more corresponding user terminals.

3. The method of claim 1 further comprising:
attenuating an amplitude of a set of transmit spatial weights of at least one of the one or more communication signals such that interference caused by one or more communication signals to the synchronization burst is reduced.

4. The method of claim 1 wherein the multi-access channel is a time division multiple access channel.

5. The method of claim 1 wherein the attenuated amplitude of the set of transmit spatial weights of the at least one communication signal is sufficient to maintain a communication link with the one or more corresponding user terminals.

6. The method of claim 2 wherein the transmit spatial weights of the synchronization burst are determined based upon a characteristic of the corresponding user terminal.

7. The method of claim 6 where in the characteristic is a spatial signature of the user terminal attempting to reestablish communication over an SDMA channel of the multi-access channel, the spatial signature determined when the user terminal was communicating over the SDMA channel of the multi-access channel.

8. The method of claim 1 in which communication is reestablished with the corresponding user terminal over the SDMA channel of the multi-access channel.

9. The method of claim 8 further comprising:
broadcasting the synchronization burst corresponding to the next user terminal; and repeating the operations of determining a set of transmit spatial weights for a synchronization burst corresponding to a next user terminal, and broadcasting the synchronization burst to the corresponding user terminal until communication is reestablished with all of the one or more user terminals attempting to reestablish communication over an SDMA channel of the multi-access channel.

10. A method comprising:
alternately broadcasting each of a set of synchronization bursts, each synchronization burst corresponding to one of a plurality of user terminals attempting to reestablish communication over respective corresponding SDMA channels of a multi-access channel;
reestablishing communication with a first user terminal of the plurality of user terminals over the corresponding SDMA channel;
transmitting a communication signal to the first user terminal over the corresponding SDMA channel;
determining a set of transmit spatial weights for a synchronization burst corresponding to one of the one or more remaining user terminals attempting to reestablish communication over a corresponding SDMA channel of a multi-access channel, the set of transmit spatial weights determined such that interference between the synchronization burst and the communication signal to the first user terminal is reduced; and
broadcasting the corresponding synchronization burst to the corresponding user terminal such that communication with the corresponding user terminal over the corresponding SDMA channel is reestablished.

11. The method of claim 10 wherein a set of transmit spatial weights of each of the synchronization bursts is determined to approximate an omni-directional radiation pattern for the synchronization burst.

12. The method of claim 10 wherein the set of transmit spatial weights of the synchronization burst are orthogonal to a spatial signature of the first user terminal.

13. The method of claim 10 further comprising:
repeating the operations of determining a set of transmit spatial weights for a synchronization burst and broadcasting the synchronization burst to the corresponding user terminal until communication is reestablished with all of the one or more user terminals attempting to reestablish communication over an SDMA channel of the multi-access channel.

14. The method of claim 12 further comprising:
attenuating an amplitude of a set of transmit spatial weights of one or more of the communication signals such that interference between each synchronization burst and the one or more communication signals is reduced.

15. A wireless communication system comprising:
a mobile switching center; and
a plurality of base stations coupled to the mobile switching center, each base station servicing a plurality of user terminals wherein a base station alternately broadcasts each of a set of synchronization bursts, each synchronization burst corresponding to one of a plurality of user terminals attempting to reestablish communication over respective corresponding SDMA channels of a multi-access channel, and reestablishes communication with a first user terminal of the plurality of user terminals over the corresponding SDMA channel wherein the base station subsequently transmits a communication signal to the first user terminal over the corresponding SDMA channel, determines a set of transmit spatial weights for a synchronization burst corresponding to one of the one or more remaining user terminals attempting to reestablish communication over a corresponding SDMA channel of a multi-access channel, the set of transmit spatial weights determined such that interference between the synchronization burst and the communication signal to the first user terminal is reduced, and broadcasts the corresponding synchronization burst to the corresponding user terminal such that communication with the corresponding user terminal over the corresponding SDMA channel is reestablished.

16. The wireless communication system of claim 15 wherein a set of transmit spatial weights of each of the synchronization bursts are determined to approximate an omni-directional radiation pattern for the synchronization burst.

17. The wireless communication system of claim 15 wherein the set of transmit spatial weights of the synchronization burst are orthogonal to a spatial signature of the first user terminal.

18. The wireless communication system of claim 15 wherein the base station repeats the operations of determining a set of transmit spatial weights for a synchronization burst and broadcasting the synchronization burst to the corresponding user terminal are repeated until communication is reestablished with all of the one or more user terminals attempting to reestablish communication over an SDMA channel of the multi-access channel.

19. The wireless communication system of claim 17 wherein the base station attenuates an amplitude of a set of transmit spatial weights of one or more of the communication signals such that interference between each synchronization burst and the one or more communication signals is reduced.

20. A machine-readable medium having one or more executable instructions stored thereon, which when executed by a digital processing system cause the digital processing system to perform a method, the method comprising:

transmitting a communication signal over each of one or more SDMA channels of a multi-access channel to one or more corresponding user terminals;

determining a set of transmit spatial weights for a synchronization burst corresponding to one of one or more user terminals attempting to reestablish communication over an SDMA channel of the multi-access channel, the set of transmit spatial weights determined such that interference caused by one or more communication signals to the synchronization burst is reduced;

broadcasting the synchronization burst to the corresponding user terminal; and     determining a set of transmit spatial weights for a synchronization burst corresponding to a next user terminal of the one or more user terminals attempting to reestablish communication over an SDMA channel of the multi-access channel, the set of transmit spatial weights determined such that interference between the synchronization burst corresponding to the next user terminal and the one or more communication signals is reduced.

21. The machine-readable medium of claim 20 wherein the set of transmit spatial weights of the synchronization burst are orthogonal to a spatial signature of at least one of the one or more corresponding user terminals.

22. The machine-readable medium of claim 20 further comprising:

attenuating an amplitude of a set of transmit spatial weights of at least one of the one or more communication signals such that interference caused by one or more communication signals to the synchronization burst is reduced.

23. The machine-readable medium of claim 20 wherein the multi-access channel is a time division multiple access channel.

24. The machine-readable medium of claim 20 wherein the attenuated amplitude of the set of transmit spatial weights of the at least one communication signal is sufficient to maintain a communication link with the one or more corresponding user terminals.

25. The machine-readable medium of claim 20 wherein the transmit spatial weights of the synchronization burst are determined based upon a characteristic of the corresponding user terminal.

26. The machine-readable medium of claim 25 wherein the characteristic is a spatial signature of the user terminal attempting to reestablish communication ever an SDMA channel of the multi-access channel, the spatial signature determined when the user terminal was communicating over the SDMA channel of the multi-access channel.

27. The machine-readable medium of claim 20 in which communication is reestablished with the corresponding user terminal over the SDMA channel of the multi-access channel.

28. The machine-readable medium of claim 27 wherein the method further comprises:

repeating the operations of determining a set of transmit spatial weights for a synchronization burst, and broadcasting the synchronization burst to the corresponding user terminal until communication is reestablished with all of the one or more user terminals attempting to reestablish communication over an SDMA channel of the multi-access channel.

29. A machine-readable medium having one or more executable instructions stored thereon, which when executed by a digital processing system cause the digital processing system to perform a method, the method comprising:

alternately broadcasting each of a set of synchronization bursts, each synchronization burst corresponding to one of a plurality of user terminals attempting to reestablish communication over respective corresponding SDMA channels of a multi-access channel;

reestablishing communication with a first user terminal of the plurality of user terminals over the corresponding SDMA channel;

transmitting a communication signal to the first user terminal over the corresponding SDMA channel;

determining a set of transmit spatial weights for a synchronization burst corresponding to one of the one or more remaining user terminals attempting to reestablish communication over a corresponding SDMA channel of a multi-access channel, the set of transmit spatial weights determined such that interference between the synchronization burst and the communication signal to the first user terminal is reduced; and     broadcasting the corresponding synchronization burst to the corresponding user terminal such that communication with the corresponding user terminal over the corresponding SDMA channel is reestablished.

30. The machine-readable medium of claim 29 wherein a set of transmit spatial weights of each of the synchronization bursts is determined to approximate an omni-directional radiation pattern for the synchronization burst.

31. The machine-readable medium of claim 29 wherein the set of transmit spatial weights of the synchronization burst are orthogonal to a spatial signature of the first user terminal.

32. The machine-readable medium of claim 29 further comprising:

repeating the operations of determining a set of transmit spatial weights for a synchronization burst and broadcasting the synchronization burst to the corresponding user terminal are repeated until communication is reestablished with all of the one or more user terminals attempting to reestablish communication over an SDMA channel of the multi-access channel.

33. The machine-readable medium of claim 31 wherein the method further comprises:

attenuating an amplitude of a set of transmit spatial weights of one or more of the communication signals such that interference between each synchronization burst and the one or more communication signals is reduced.

* * * * *